Sept. 27, 1927.
I. V. SHUPE
TIRE LOCKING DEVICE
Original Filed April 22, 1925
1,643,824
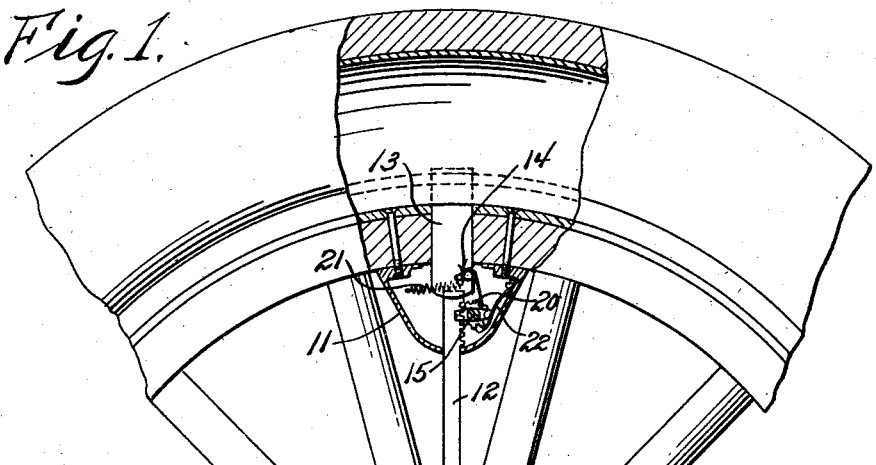
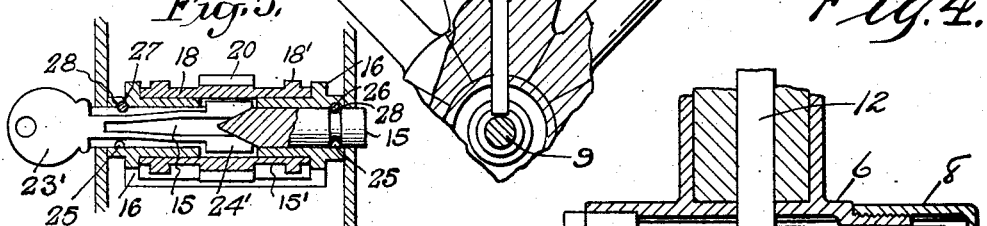
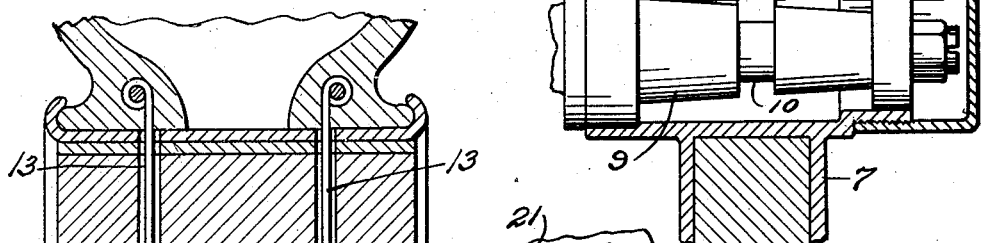
I. V. Shupe INVENTOR
BY Victor J. Evans ATTORNEY
WITNESS: John Donovan Patented Sept. 27, 1927.

1,643,824

UNITED STATES PATENT OFFICE.

ILES VOIGHT SHUPE, OF NORTHFORK, WEST VIRGINIA.

TIRE-LOCKING DEVICE.

Application filed April 22, 1925, Serial No. 25,103. Renewed June 10, 1927.

My invention relates to locking devices, and its primary object is to provide a locking device for locking the ground engaging tires and the wheels thereof of an automobile to the axles thereof, and also for locking the spare tire and wheel thereof, so that none of the tires or wheels can be removed from the automobile by an unauthorized person.

The invention contemplates a tire locking device for the wheels and tires of a motor vehicle, and which includes a key operated mechanism for retracting the locking bolt from a part of the motor vehicle, so that the tire and its wheel can be readily detached therefrom.

The invention also contemplates a device of this character which can be used in conjunction with any type of vehicle wheel and tire and which is efficient and durable in use.

With the proceeding and other objects and advantages in view, the invention consists in the novel construction and arrangement of elements to be hereinafter specifically referred to, illustrated in the accompanying drawings and pointed out in the appended claims.

In the drawings:—

Figure 1 is a view partly in section and partly in elevation of an automobile wheel and tire embodying my invention.

Figure 2 is a fragmentary vertical sectional view of the same.

Figure 3 is a detail view of parts of the invention and, Figure 4 is a fragmentary elevation of the wheel and hub.

Figure 5 is a view partially in section to illustrate the locking means.

Referring to the drawings in detail wherein like characters of reference denote corresponding parts throughout the several views, the numeral 5 designates an automobile wheel. This wheel comprises a hub 6 provided with pairs of annular flanges 7 which embrace the spokes as shown. The hub cap is shown at 8. Received in the hub is an axle spindle 9 which is provided with a circumferential groove 10 to be engaged by a locking bolt to be hereinafter set forth.

Secured to the underface of the wheel felly is a casing 11 in which one end of a movable locking bolt 12 is received. This locking bolt passes through the hub as shown and engageable in the groove 10.

Arranged on the wheel is a tire of the usual construction with the exception that wires 12' are arranged in the beads thereof as clearly shown in Figure 2 of the drawings, and to the wire of which a pair of plates 13 are attached and these plates 13 extend through coinciding openings in the rim and felly and pass into the casing 11 and are provided with notches 14. It should also be noted that the plates 13 have their bead engaging ends looped about the wire which together with the wire are moulded in the bead of the tires during the making of said tire.

A shaft 15 is formed with a longitudinal slot terminating approximately midway its ends and said shaft is provided with a V-shaped portion which forms the inner wall of the slot. Fixed to rotate with a sleeve 15' surrounding said shaft 15 is a U-shaped member 16 having inwardly directed lateral extensions 17. A sleeve 18 is loosely mounted on this sleeve 15' and carried by the sleeve 18 is a pair of parallel arms 18' carrying a pin 19 on the free ends thereof. The pin 19 is adapted to be engaged in the notches 14 for the purpose of affording a connection between the arms 18' and plates 13. The upper end of the bolt 12 is provided with ratchet teeth and meshing with these teeth is a pinion 20 fixed to rotate with the sleeve 18.

A contractile spring 21 has one end connected to one of the arms 18' and the opposite end anchored within the casing 11 to normally hold these locking arms in the position where the ends of the pin 19 will engage in the notches 14.

In order to lock the pinion 20 against rotation when the parts are normal there is provided a spring arm 22 arranged below this pinion and this spring arm 22 is provided with a detent 23 which is engageable with the teeth of this pinion.

When it is desired to remove the tire a key 23' having resilient arms adapted to be separated by the V-shaped portion of the shaft 15 is placed within the key receiving opening 24 of the slot in the shaft 15 and the latter rotated. Due to the projections 24' disposed on the resilient arms of the key, which engages in recesses in the sleeve 15' the latter will be partially rotated with the result that the U-shaped member 16 will be likewise moved. As this sleeve 15' rotates the extensions 17 engage the arms 18' to move the latter in a direction to disengage the ends of the pin 19 from the slots or notches 14. In rotation of the sleeve 15', the U-shaped member engages the spring arm 22 as shown in Figure 3 to release the detent 23 from the teeth of the pinion, so that the extensions 17 will engage and move the arms 18' as above set forth. The continued rotation of the shaft causes the locking bolt to be raised from the circumferential groove 10 in the axle.

The shaft 15 is formed with a circumferential groove 25 adjacent each end, and the sleeve 15' is also formed with grooves 26 and 27 to cooperate with the grooves 25 as shown in Figure 5 of the drawings, and received in these cooperating grooves are pins 28 to prevent the lateral displacement of the respective parts, but insuring rotation thereof as will be readily apparent.

By employing the bolt 12 for engagement with the groove 10 in the axle 9 as shown in Figures 1 and 4, it will be obvious that the wheels which have my novel locking device thereon, cannot be removed from their axles until the bolt is retracted in the manner as above set forth, therefore my locking device not only locks the tires of a vehicle to the wheels but also locks the wheels to the vehicle. The spare tire or tires of the vehicle will also have a wheel and an axle or other means provided with a slot similar to the slot 10 so that my novel locking device can be used for the spare tires and wheels in the same manner as for the other tires and wheels of the vehicle.

While I have shown and described the preferred embodiment of the invention, I desire to have it understood that such changes may be made in the form, construction and arrangement of parts and operations, as will not depart from the spirit of the invention or the scope of the subjoined claims.

Having thus described my invention, I claim:—

1. The combination with a vehicle wheel and a pneumatic tire casing mounted thereon, of a casing carried by the felly of said wheel, a pair of plates fixed to the tire beads and passing through the felly, rotatable key actuated means including sleeves journaled in the casing, parallel arms on one of said sleeves, a pin carried by the parallel arms and normally engage with said plates, a pinion fixed to rotate with the key actuated means, a longitudinally movable lock member passing through the casing and having one end adapted to operatively engage a groove in the axle of the wheel, a spring normally holding the pin into engagement with the notches, a U-shaped member carried by the other of said sleeves for rotation therewith, a spring held detent arranged in the path of the U-shaped member to be engaged thereby to hold the same away from the pinion, and the pinion being rotatable by the key actuated means whereby to move the latch element to operative or inoperative position.

2. The combination with an automobile wheel and a pneumatic casing mounted thereon, a pair of notched plates carried by the beads of the tire casing and passing through the felly of said wheel, a longitudinally movable lock bolt operatively engaged with a groove in axle of the wheel, a pair of swinging arms, a pin carried by said arms and normally engaged in the notches of the plates, a key actuated means for swinging the arms and means included in said key actuated means for moving the latch bolt for disengaging the pin from the notches.

In testimony whereof I affix my signature.

ILES VOIGHT SHUPE.